(12) United States Patent
Seo et al.

(10) Patent No.: US 11,703,520 B2
(45) Date of Patent: Jul. 18, 2023

(54) WAFER TYPE SENSOR UNIT AND DATA ACQUISITION METHOD USING THE WAFER TYPE SENSOR UNIT

(71) Applicant: SEMES CO., LTD., Chungcheongnam-do (KR)

(72) Inventors: Yong-Jun Seo, Gyeonggi-do (KR); Sang Hyun Son, Busan (KR); Ji Su Hong, Chungcheongnam-do (KR); Jae Myoung Lee, Chungcheongnam-do (KR); Dong Ok Ahn, Gyeonggi-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/482,845

(22) Filed: Sep. 23, 2021

(65) Prior Publication Data

US 2022/0091150 A1 Mar. 24, 2022

(30) Foreign Application Priority Data

Sep. 24, 2020 (KR) .......................... 10-2020-0124236

(51) Int. Cl.
*G01P 5/12* (2006.01)
*G01P 13/04* (2006.01)
*G01P 13/00* (2006.01)
*G01P 13/02* (2006.01)

(52) U.S. Cl.
CPC .............. *G01P 5/12* (2013.01); *G01P 13/006* (2013.01); *G01P 13/02* (2013.01); *G01P 13/045* (2013.01)

(58) Field of Classification Search
CPC .......... G01P 5/12; G01P 13/006; G01P 13/02; G01P 13/045
See application file for complete search history.

(56) References Cited

U.S. PATENT DOCUMENTS

| 2010/0186496 A1* | 7/2010 | Galley | .................... | G01P 13/02 |
| | | | | 374/138 |
| 2015/0006108 A9* | 1/2015 | Renken | ................... | H01L 22/34 |
| | | | | 702/182 |

FOREIGN PATENT DOCUMENTS

| CN | 103105506 A | * | 5/2013 | ............. G01F 1/688 |
| CN | 107373922 A | * | 11/2017 | ........... A44C 5/0007 |
| GB | 2301188 A | * | 11/1996 | ............... G01P 13/02 |
| JP | 2003-106884 A | | 4/2003 | |
| JP | 2013-167451 A | | 8/2013 | |
| KR | 10-1805952 B1 | | 12/2017 | |
| KR | 10-1853505 B1 | | 4/2018 | |
| WO | 2017/11196 A1 | | 1/2017 | |

\* cited by examiner

*Primary Examiner* — Ryan D Walsh
(74) *Attorney, Agent, or Firm* — Carter, Deluca & Farrell LLP

(57) ABSTRACT

The inventive concept provides a wafer type sensor unit which acquires data on a wind direction and a wind velocity of an air flow during processing, the wafer type sensor unit supported by a supporting unit of a substrate processing apparatus. The unit comprising a wafer-shaped circuit board and a hot-wired wind velocity sensor placed apart from an upper surface of the circuit board.

14 Claims, 8 Drawing Sheets

WAFER TYPE SENSOR UNIT AND DATA ACQUISITION METHOD USING THE WAFER TYPE SENSOR UNIT

CROSS-REFERENCE TO RELATED APPLICATIONS

A claim for priority under 35 U.S.C. § 119 is made to Korean Patent Application No. 10-2020-0124236 filed on Sep. 24, 2020, in the Korean Intellectual Property Office, the entire contents of which are hereby incorporated by reference.

BACKGROUND

Embodiments of the inventive concept described herein relate to a wafer type sensor unit and a data acquisition method using the wafer type sensor unit. More specifically, embodiments of the inventive concept described herein relate to a wafer type sensor unit that can measure an air flow in a perpendicular direction.

In a semiconductor process, a wind direction and a wind velocity of an air flow has a close relationship with a distribution of a particle and a temperature. One important challenge is to uniformly control the wind direction and the wind velocity of an air flow by measuring an air flow that reaches a wafer. There is no conventional commercial product that can measure an air flow at the wafer's surface, so a method of installing a commercialized wind velocity sensor inside a certain position of an apparatus together with a jig to measure the wind velocity, and then estimating the air flow inside the apparatus was used. However, such a method using a commercialized wind velocity sensor to analyze an air flow carried difficulties.

The conventional method had a high possibility of errors in a measured result due to human errors such as an angle or a height of an anemometer which is directly installed by a person. Also, when measuring the wind velocity, disassembling the equipment and installing an assisting jig was difficult depending on the structure of the equipment. Another problem was that it was impossible to measure the wind velocity in a perpendicular with the conventional method. Also, the structure of the anemometer and the jig can become an obstacle against the air flow on the wafer, and a measurement error can occur depending on differences in the distance to the wafer.

SUMMARY

The inventive concept provides a wafer type sensor unit to improve a method of air flow analysis in a semiconductor process.

The technical objectives of the inventive concept are not limited to the above-mentioned ones, and the other unmentioned technical objects will become apparent to those skilled in the art from the following description.

In an embodiment of the inventive concept, provided is a wafer type sensor unit for acquiring data on a wind direction and a wind velocity of an air flow during processing, the wafer type sensor unit supported by a supporting unit of a substrate processing apparatus, The wafer type sensor unit may include a wafer-shaped circuit board and a hot-wired wind velocity sensor placed apart from an upper surface of the circuit board.

In an embodiment, a plurality of hot-wired wind velocity sensors are provided and the plurality of hot-wired wind velocity sensors may be placed apart from a center of the circuit board.

In an embodiment, the plurality of hot-wired wind velocity sensors are arranged in a circular shape concentric with the center of the circuit board.

In an embodiment, the plurality of hot-wired wind velocity sensors are placed apart 0.55 mm or greater from the upper surface of the circuit board.

In an embodiment, the plurality of hot-wired wind velocity sensors may be placed the same distance apart from the upper surface of the circuit board.

In an embodiment, a distancing member may be further included for placing apart the circuit board and the hot-wired wind velocity sensor.

In an embodiment, the distancing member is provided as an insulator.

In an embodiment, the wafer type sensor unit may further include an electronic device installed on a bottom surface of the circuit board.

In an embodiment, the electronic device may further include a power unit and a signal processing unit which processes signals of the circuit board.

In another embodiment of the inventive concept, provided is a wafer type sensor unit for acquiring data on a wind direction and a wind velocity of an air flow during processing, the wafer type sensor unit supported by a supporting unit of a substrate processing apparatus.

The wafer type sensor unit may include a wafer-shaped circuit board, an electronic device installed on an upper surface of the circuit board and coated with a coating layer, wherein the height of the coating layer from the upper surface of the circuit board is constant, and a hot-wired wind velocity sensor placed apart from an upper surface of the coating layer.

In another embodiment of the inventive concept, provided is a data acquisition method using the wafer type sensor unit of another embodiment of the inventive concept, for acquiring data on a wind direction and a wind velocity of an air flow during processing.

The above method may include measuring a wind velocity at each position where the hot-wired wind velocity sensor is placed, and measuring a wind velocity in a perpendicular direction to the surface of a circuit board using the measurements of the hot-wired wind velocity sensor.

In an embodiment, measuring a wind velocity at each position where the hot-wired wind velocity sensor is placed may include measuring a wind velocity in a perpendicular direction to the surface of a circuit board at each position where the hot-wired wind velocity sensor is placed.

The inventive concept can improve the accuracy of the measurements when compared with a conventional air flow analysis method.

The inventive concept is efficient in the aspect of a user's convenience and automatization of PM.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1A:
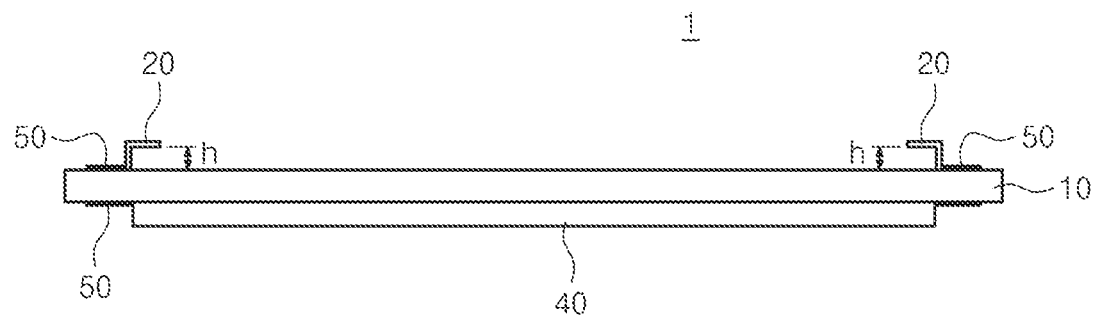
FIG. 1A to FIG. 1B are views illustrating a wafer type sensor unit according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

In the specification, the singular forms include plural forms unless particularly mentioned. Also, the shapes or sizes of elements in a figure may be exaggerated for a clearer illustration.

Although not defined, all the terms (including technical or scientific terms) used herein may have the same meanings that are generally accepted by the common technologies in the field to which the inventive concept pertains. The terms defined by the general dictionaries may be construed to have the same meanings as those meant in the related technologies and the disclosure of the application, and will neither become conceptual nor be construed to be excessively formal even though not clearly defined herein. The terms used herein are provided to describe the embodiments but not to limit the inventive concept. In the specification, the singular forms include plural forms unless particularly mentioned. The expressions 'include' and its various conjugated forms, such as 'including', which are used in the specification do not exclude existence or addition of one or more compositions, substances, elements, steps, operations, and devices.

The terms "unit", "part", and the like may be used to indicate a unit of processing at least one function or operation. For example, such terms may mean software, or a hardware element such as FPGA or ASIC. However, such terms are not limited to software or hardware. The "unit", "part", and the like may be configured to be included within an addressable storage medium or to operate one or more processors.

Thus, "unit", "part", and the like may include constituent elements such as software elements, Object-Oriented software elements, class elements, and task elements, processes, functions, attributes, procedures, sub-routines, segments of program code, drivers, firmware, micro code circuit, data, database, data structures, tables, arrays, and variables. Elements and functions provided within the "unit", "part", and the like may be divided into elements and "unit", "part" and the like, or may be jointed with other additional number of elements.

According to a wafer sensor unit 1 in an embodiment of the inventive concept, by placing a hot-wired wind velocity sensor 20 apart from an upper surface of a circuit board 10, an air flow on the upper surface of the circuit board 10 can be measured at a desired position. Also, by installing the hot-wired wind velocity sensor 20 with the least amount of hot-wires and wiring 50 on the upper surface of the circuit board 10, and by integrating electronic devices 40 such as a signal processing unit, a power unit etc in a lower portion of the circuit board, factors influencing an air flow above the circuit board can be minimized.

Figure 1B:
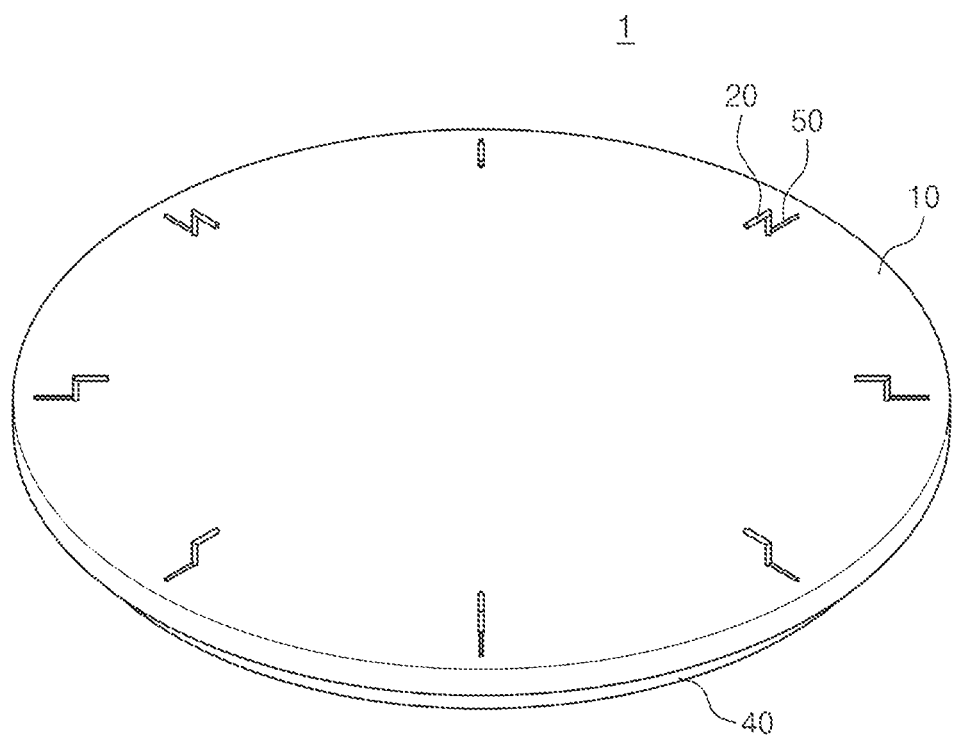

FIG. 1A to FIG. 1B illustrate a wafer type sensor unit 1 according to an embodiment of the inventive concept.

In an embodiment of the inventive concept, the wafer type sensor unit 1 may include a circuit board 10, a hot-wired wind velocity sensor 20, and an electronic device 40. The wafer type sensor unit 1 according to an embodiment can be supported by a supporting unit of a substrate processing apparatus and acquire data on a wind direction and a wind velocity of an air flow during processing.

In an embodiment, the circuit board 10 may be a PCB substrate. The circuit board 10 can be wafer-shaped. The circuit board 10 can be formed in a size and a shape that matches a wafer. The electronic device 40 can be placed at a bottom surface of the circuit board 10. The electronic device 40 which may be included in the wafer type sensor unit 1 may include a power unit, a signal processing unit, a sensor unit, etc. In an embodiment, the electronic device 40 which may be included in the wafer type sensor unit 1 may further include wiring 50 to connect the electronic devices 40 with each other, a micro-controller unit (MCU) etc.

In an embodiment, the power unit may include a battery for providing an operation power. In an embodiment, the sensor unit may include a sensor for sensing one of various environmental conditions. In an embodiment, the sensor unit can include a temperature sensor, a pressure sensor etc. The signal processing unit can conduct signal processing on information received from the sensor unit. The signal processing unit may include other parts such as a communication unit which transmits information.

In an embodiment, the electronic devices 40 placed on the bottom surface of the circuit board 10 may have their surfaces coated. In an embodiment, the electronic devices 40 placed at the bottom surface of the circuit board 10*e* can be protected with a film, and/or can be covered with a cover.

The coating of the bottom surface of the wafer type sensor unit 1 can be either a cover and/or a case to protect the electronic devices 40 from an outside environment. To minimize the weight, PI, a film or a cover of Teflon, etc can be used; and/or a coating of epoxy, PI, or acrylic etc can be used too.

In an embodiment of the inventive concept, the hot-wired wind velocity sensor 20 may be provided above an upper surface of a circuit board 10. A plurality of hot-wired velocity sensors 20 can be provided. The hot-wired velocity sensor 20 can be placed apart from the upper surface of the circuit board 10, so that the wind velocity of an air flow can be measured in a perpendicular direction to the surface of a circuit board.

In another embodiment of the inventive concept, the hot-wired wind velocity sensor 20 can be provided in various configurations such as linear, oval, coiled etc. In another embodiment of the inventive concept, the hot-wired wind velocity sensor 20 may be provided with only a hot-wire or may be integrated into a PCB or a film. In an embodiment of an inventive concept, the hot-wired wind velocity sensor 20 can measure a wind velocity using changes of a temperature of the hot-wire.

The exemplary embodiments of the inventive concept can measure an air flow in an area close to a wafer by using a hot-wired anemometer. When the hot-wired wind velocity sensor 20 is used according to an embodiment of the inventive concept, the hot-wired anemometer uses a wire with a micro-width, so the configuration is small, efficient, and can be structurally optimized.

An ultrasonic method can be used instead of a hot-wired wind velocity sensor 20 by minimizing the configuration by making a sensor smaller. However, in the ultrasonic method, two ultrasonic sensors facing each other must be installed or a reflector is needed. Also, in the ultrasonic method, there is difficulty in measuring an edge area where an air flow is greater. The hot-wired wind velocity sensor 20 is preferably used.

In an embodiment, a method using the hot-wired wind velocity sensor 20 can measure a wind velocity according to the extent that the wire heated to a high temperate is cooled by a wind velocity. Depending on the cooling of the heated wire by the wind velocity, the voltage may change and the wind velocity can be measure by the voltage change with reference to reference value.

Thus, in an embodiment, the hot-wired wind velocity sensor 20 may be placed apart from a surface of the circuit board 10 to measure a wind velocity in a perpendicular direction to the surface of the circuit board 10. In an embodiment, a wind speed deflection can be determined by arranging the plurality of hot-wired wind velocity sensors 20 in a circle concentric with the circuit board 10.

Also, according to an embodiment of FIG. 1, the electronic devices 40 are placed at the bottom surface of the circuit board 10, and only the hot-wired wind velocity sensor 20 and the wiring 50 for transferring heat and connecting are exposed at the upper surface of the circuit board 10. Accordingly, the electronic devices 40 inherently cannot block the air flow at the upper side of the circuit board 10, thereby achieving a more accurate air flow measurement.

Figure 2A:
FIG. 2A to FIG. 2B are views illustrating a wafer type sensor unit according to another embodiment of the inventive concept.
Figure 2B:
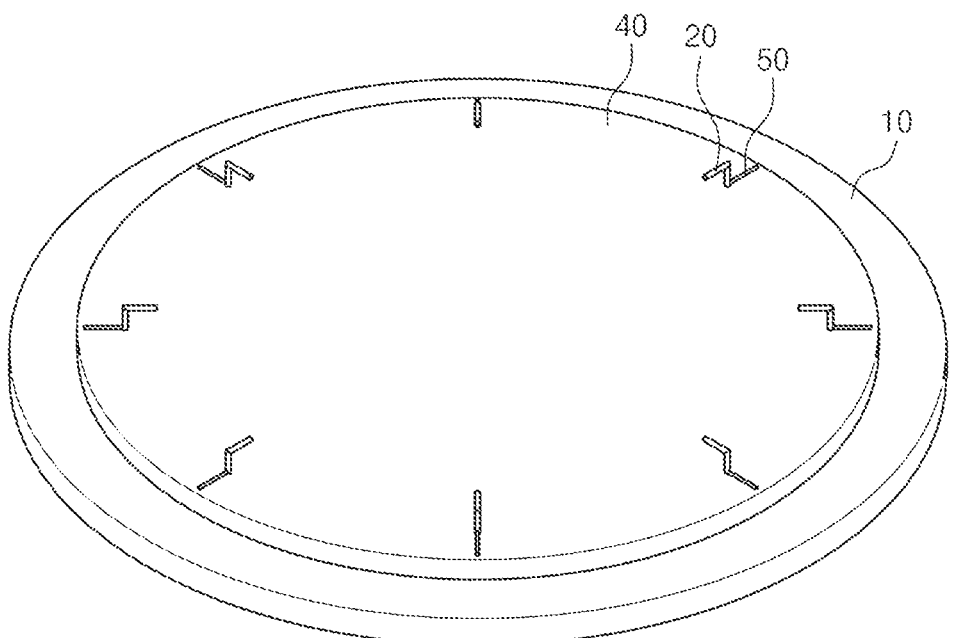

FIG. 2A to FIG. 2B illustrate a wafer type sensor unit 1 according to another embodiment of the inventive concept.

For convenience of explanation, the descriptions to the same elements in the example embodiments of FIGS. 1A and 1B will be omitted and the differences between the embodiments of FIG. 2 and FIG. 1 will be mainly described hereinafter.

According to FIG. 2, electronic devices 40 may be placed at an upper surface and not a bottom surface of a circuit board 10. In an embodiment, the electronic devices 40 may include a signal processing unit and a power unit, a sensor unit, etc like the embodiment of FIG. 1. In an embodiment of FIG. 2 the electronic devices 40 may include the signal processing unit and the power unit, and the electronic devices 40 may be coated with a coating layer. In an embodiment, the height of the coating layer from the upper surface of the circuit board 10 is constant. The height of the coating layer provided on the electronic devices 40 installed on the circuit board 10 can be constant across the entire area of the circuit board 10. In an embodiment of FIG. 2, a plurality of hot-wired wind velocity sensors 20 are placed above the upper surface of the coating layer of the electronic devices 40, so that all the hot-wired wind velocity sensors 20 can be placed at an equal height.

Referring to FIG. 2, the hot-wired wind velocity sensors 20 can be placed at a certain distance from the upper surface of the coating layer of the electric devices 40.

According to the embodiment of FIG. 2, the electronic devices 40 are provided at upper side of the circuit board 10 and thus the wafer type sensor unit 1 of this embodiment has a bottom side relative flat as compared to the embodiment of FIG. 1 where the electronic devices 40 are provided at the bottom side of the circuit board 10. Accordingly, according to this embodiment of FIG. 2, it would be advantageous to transfer the wafer shape sensor unit 1 with a robot which supports the relatively flat bottom side of the wafer shape sensor unit 1 and transfers thereof.

Also, the hot-wired wind velocity sensors 20 are provided at a certain distance above the coating layer coating the electronic devices 40, and thus as like in FIG. 1, the electronic devices 40 may not affect an air flow and reliable measurement of an air flow is possible.

Figure 3A:
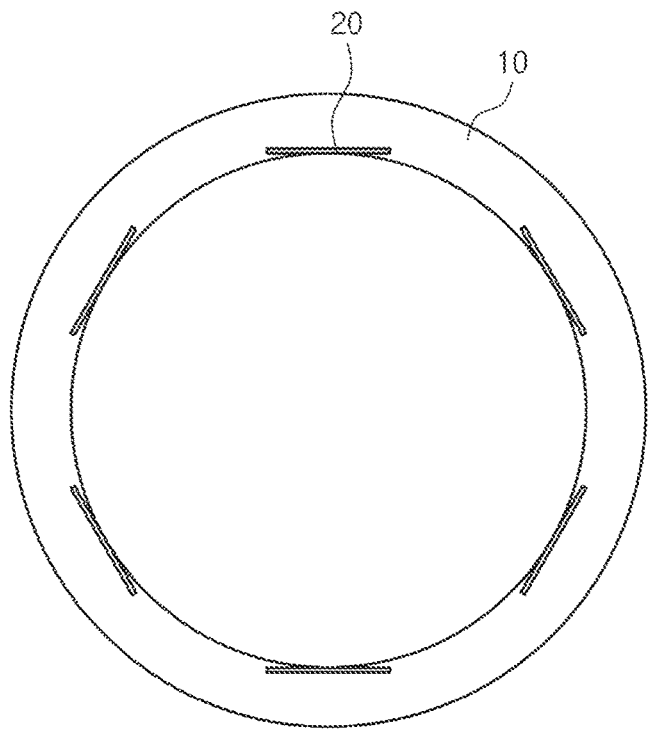
FIG. 3A to FIG. 3B are views illustrating a layout-structure of a hot-wired wind velocity sensor in a wafer type sensor unit according to an embodiment of the inventive concept.
Figure 3B:
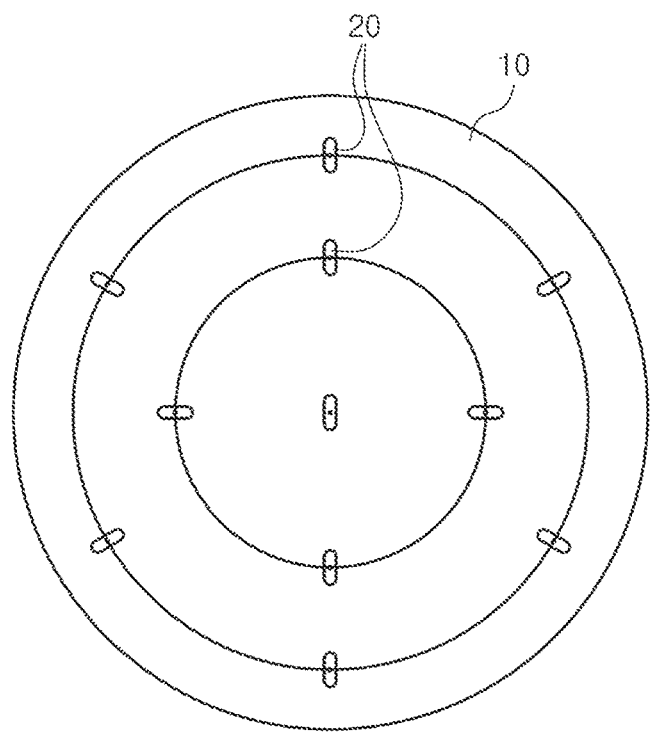

FIG. 3A to FIG. 3B are top-p illustrate a layout-structure of hot-wired wind velocity sensors 20 of a wafer type sensor unit 1 according to an embodiment of the inventive concept. The hot-wired wind velocity sensors 20 are arranged in a circular shape concentric with the circuit board 10. In other words, the hot-wired wind velocity sensors 20 are arranged on an imaginary circle which is concentric with the circuit board 10 and smaller in a diameter than the circuit board 10. The hot-wired wind velocity sensors 20 may be arranged in various way, for example in view of orientation (e.g., the lengthwise direction), on the imaginary concentric circle with the circuit board 10. The lengthwise directions of the hot-wired wind velocity sensors 20 may be arranged to form tangent lines to the imaginary concentric circle (see FIG. 3A) and/or radially arranged on the imaginary concentric circle with the circuit board 10 (see FIG. 3B), with equally spaced apart from each other. The hot-wired wind velocity sensors 20 may have the same size.

According to the embodiment of FIG. 3A, the hot-wired wind velocity sensors 20 are uniformly arranged in a circular shape concentric with the circuit board 10 with equally spaced apart from each other and with same size.

According to the embodiment of FIG. 3A, a wind speed deflection can be determined using the hot-wired velocity sensors 20 spaced uniformly apart from each other on the concentric circle with the circuit board. The hot-wired velocity sensors 20 may be arranged to form a plurality of concentric circles with the circuit board 10 (see FIG. 3B)

According to another embodiment of FIG. 3B, the plurality of hot-wired heat velocity sensors 20 are arranged to form a concentric circle with respect to the circuit board 10 and further arranged radially with respect to the circuit board 10. In other words, the plurality of hot-wired heat velocity sensors 20 are arranged to form a plurality of concentric circles with the circuit board 10 and in each concentric circle, the plurality of hot-wired heat velocity sensors 20 are arranged with its lengthwise direction being radial orientation. A single hot-wired heat velocity sensor 20 may be further arranged directly above the center of the circuit board 10. In some embodiments, the number of the plurality of hot-wired heat velocity sensors 20 in each concentric circle may increase from the center to the edge of the circuit board 10. In the embodiment of FIG. 3B, measurements of a wind velocity can be made at various positions of the circuit board 10.

According to certain embodiment wherein a plurality of hot-wired wind velocity sensors 20 are provided, a wind speed deflection can be determined by measuring a wind velocity at each position where the hot-wired wind velocity sensors are placed, and using the measured values from each position. The measurements made at each position of a hot-wired wind velocity sensor 20 may be measurements of a wind velocity in a perpendicular direction to the surface of the circuit board.

When measurements of hot-wired wind velocity sensors 20 are the same at each position, it can be determined that the air flow of all directions are flowing equally.

On the other hand, when some measurements by some hot-wired wind velocity sensors of the plurality of hot-wired wind velocity sensors 20 arranged in a circular shape concentric with the circuit board are different from other measurements by the remaining hot-wired wind velocity sensors, the direction of an air flow can be confirmed.

Figure 4:
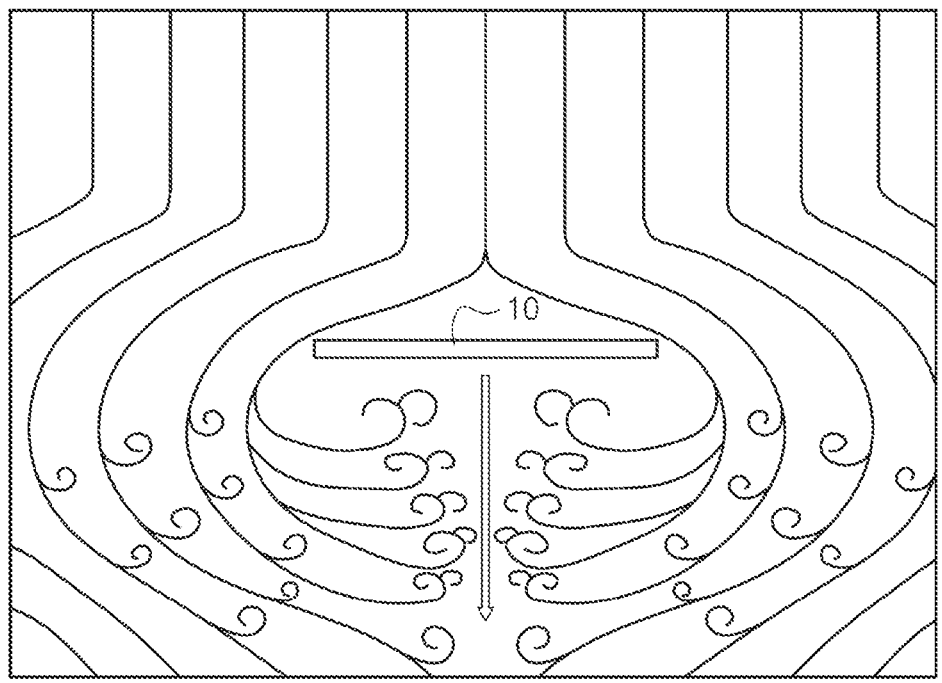
FIG. 4 is a view illustrating the influence of an air flow to a vertical slab.

FIG. 4 is a view illustrating the influence of an air flow perpendicular to a top surface of circuit board or wafer.

Referring to an embodiment of FIG. 4, when the air flows perpendicularly, there was a problem that a velocity near the top surface of the circuit board and thus near the top surface of the wafer was measured as 0.

More specifically, when the hot-wired wind velocity sensor 20 is not placed apart from the circuit board but fixed to the circuit board, there may be a problem that an air flow flowing down perpendicularly to the top surface is measured with a velocity of 0 m/s, which is outside a measurement range. Therefore, to measure the air flow flowing down perpendicularly to the top surface of the circuit board and thus the top surface of the wafer, hot-wires can be placed apart from the top surface of the circuit board 10 as like FIGS. 1 and 2, and FIG. 5, so that micro air flows can be measured.

Figure 5A:
FIG. 5A to FIG. 5B are views illustrating a layout-structure of a hot-wired wind velocity sensor in a wafer type sensor unit according to another embodiment of the inventive concept.
Figure 5B:
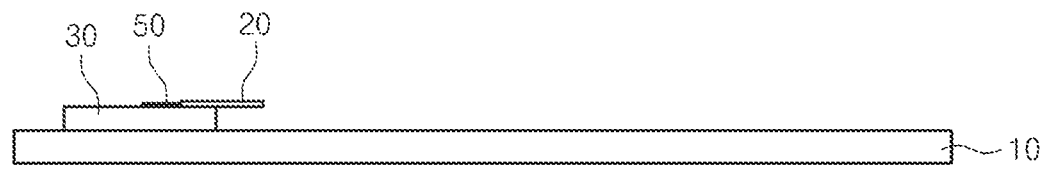

FIG. 5A to FIG. 5B are schematic cross-sectional views to illustrate a layout-structure of a hot-wired wind velocity sensor 20 in a wafer type sensor unit 1 according to another embodiment of the inventive concept.

Referring to FIG. 5, the hot-wired heat velocity sensor 20 can be placed at a constant distance apart from the upper surface of the circuit board 10. The constant distance between may be a few millimeters or a few centimeters.

The reason why the hot-wired wind velocity sensor 20 is placed apart in a constant height is illustrated hereinafter.

The mechanism of the hot-wired wind velocity sensor 20 in measuring the wind velocity is based on measuring the change of a temperature caused by an air flow. However, if the hot-wires touch the circuit board 10, its heat characteristics may be affected by the circuit board 10, and thus it is difficult to acquire an accurate measurement. Therefore, the hot-wired wind velocity sensor 20 according to an embodiment of an inventive concept may be placed apart from the upper surface of the circuit board 10. In an embodiment, the spaced apart distance of the hot-wired wind velocity sensor 20 from the upper surface of the circuit board 10 or the coating layer of the electronic devices 40 may vary depending on the strength of an air flow or a sensitivity of a sensor. The spaced apart distance of the hot-wired wind velocity sensor 20 from the upper surface of the circuit board 10 or the coating layer of the electronic devices may affect the measurement, and thus all hot-wired wind velocity sensors 20 can be placed at the same height so to ensure a uniform measurement of an air flow.

In an embodiment the hot-wired wind velocity sensor 20 can be placed apart from the circuit board 10 in a pin form and fixed to the circuit board 10 via wiring (see FIG. 5A).

In another embodiment of the inventive concept, a distancing member 30 can be provided between the hot-wired wind velocity sensor 20 and the circuit board 10 (see FIG. 5B), and thus the hot-wired wind velocity sensor 20 is spaced apart from the circuit board 10. In other words, the distancing member 30 is disposed on the circuit board 10 and the hot-wired wind velocity sensor 20 is disposed on the distancing board. In an embodiment the distancing member 30 can be an insulator. Heat loss in the hot-wired wind velocity sensor 20 can be minimized by providing the distancing member 30 as an insulator.

FIG. 6 to FIG. 9 show the measurement results of a wind velocity using a wafer type sensor unit 1 according to an embodiment of the inventive concept.

Figure 6:
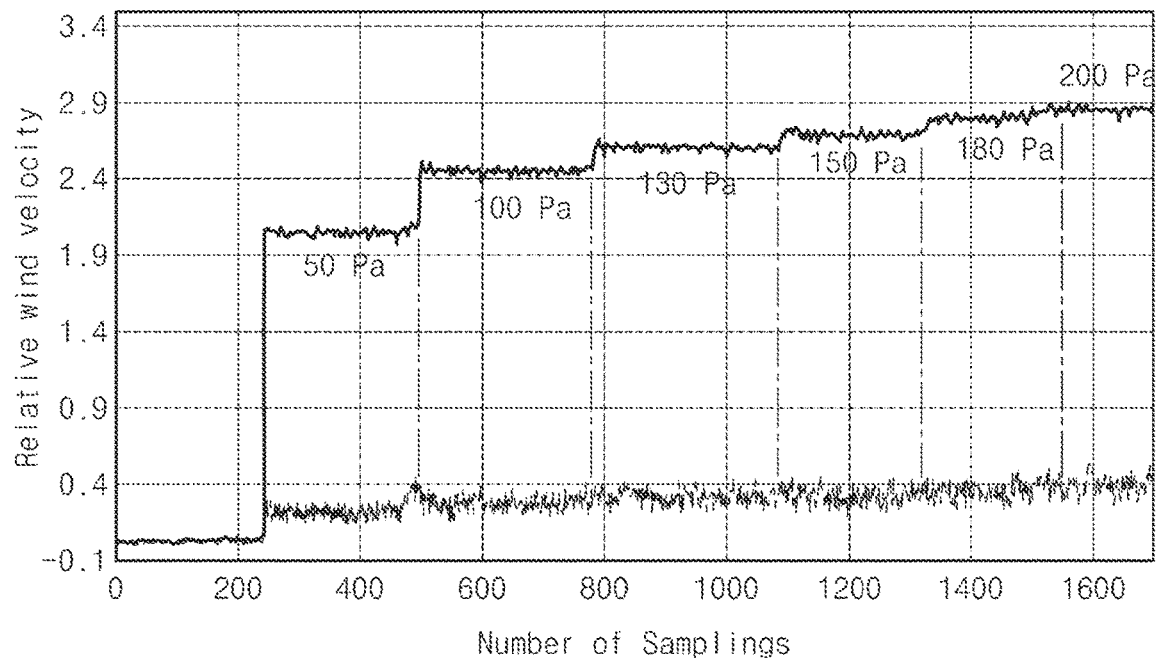
FIG. 6 to FIG. 9 is a figure illustrating measurement results of a wind velocity using a wafer type sensor unit according to an embodiment of the inventive concept.

FIG. 6 show the measurement results of the wind velocity using the wafer type sensor unit 1 under the condition that the wind velocity is provided differently according to a strength of a pan filter unit.

According to FIG. 6, the wind velocity output increases in proportion to the strength (0~200 Pa) of the fan filter unit. In an embodiment of FIG. 6, the wind velocity output of the wafer type sensor unit 1 at an edge area may be 2.0 to 2.8. The wind velocity output of the wafer type sensor unit 1 at a central part may be 0.2 to 0.4.

Figure 7:
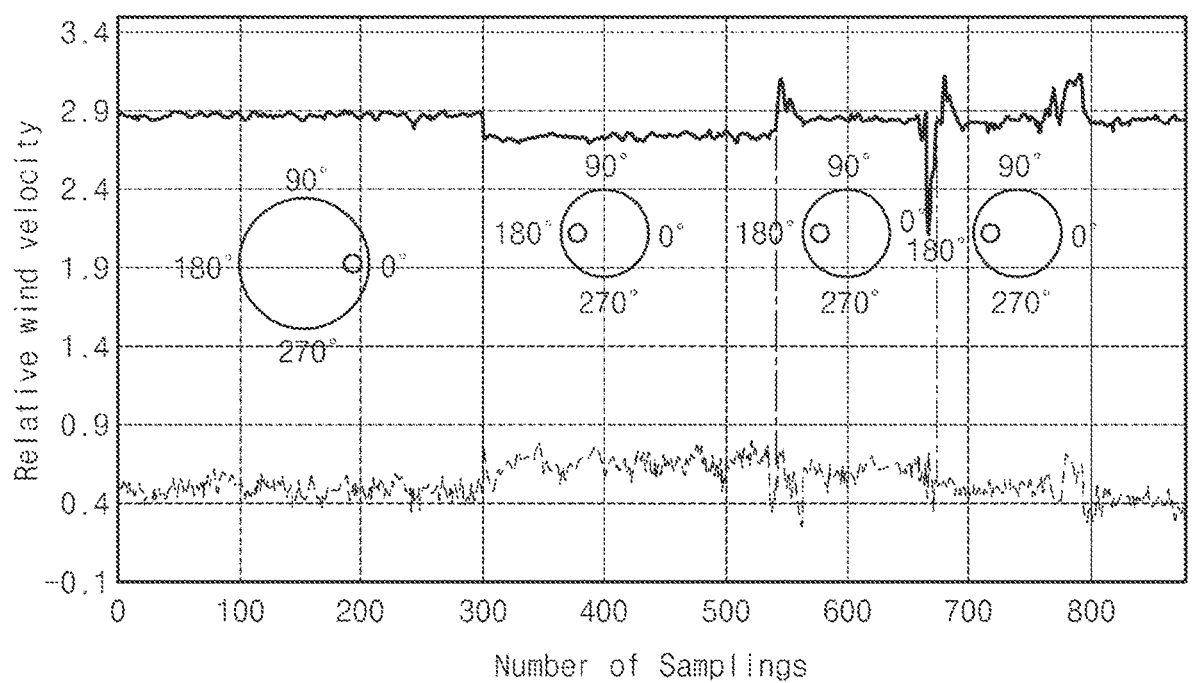

FIG. 7 show a measurement result of a wind velocity changing according to an orientation of the hot-wired wind velocity sensor 20.

Referring to FIG. 7, the measured result from the hot-wired wind velocity sensor 20 arranged in the 180° direction decreases about 6% as compared to the result from the hot-wired wind velocity sensor arranged in the initial 0° direction. Referring to FIG. 7, a wind velocity is differently measured according to the orientation of the hot-wired wind velocity sensor 20, therefore enabling detection of a direction of an air flow.

Figure 8:
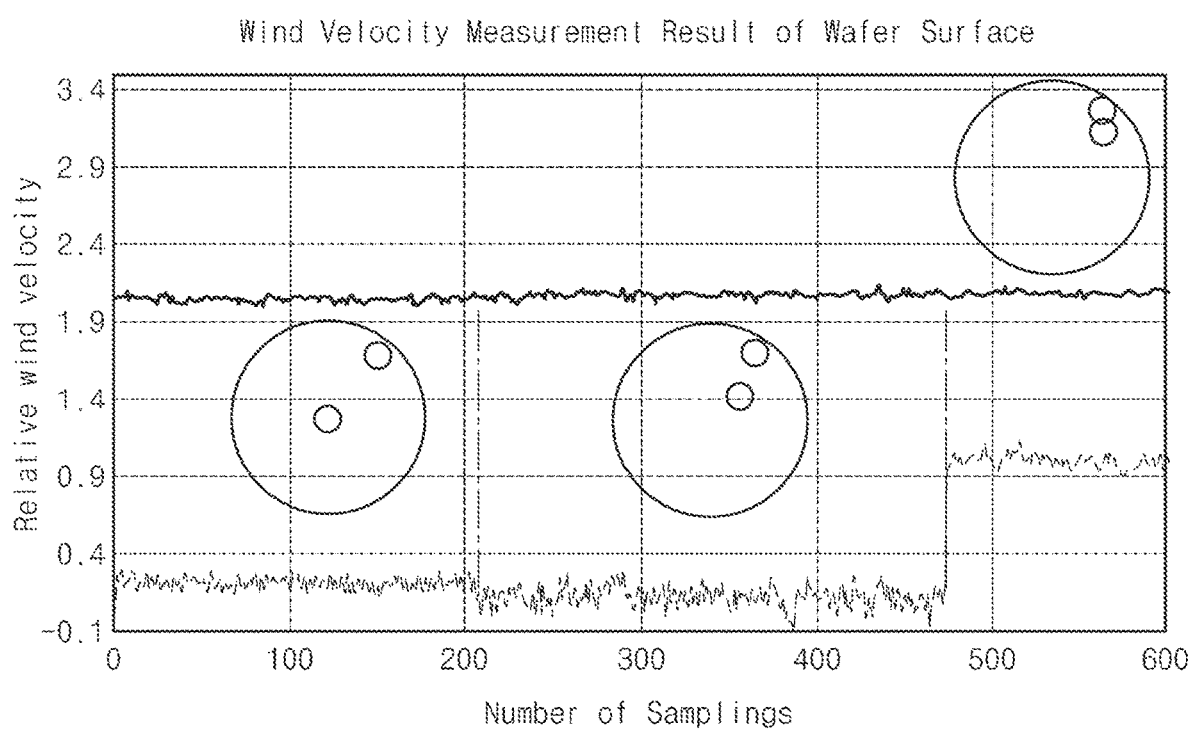

FIG. 8 shows the measurement result from the hot-wired wind velocity sensors wherein the wind velocity measured varies depending on the position of the sensors.

In FIG. 8, the wind velocity was measured by sensors with fixing one sensor at an edge area and changing the position of the other senor from a center are to the edge area. Referring to FIG. 8, it seems that the difference in wind velocity measured may be caused by differences in height between sensors due to a loss of insulator. Also a win velocity on the surface of the wafer type sensor unit 1 is measured to be strongest at the edge area, then at the central area, and then at a middle area between the edge area and the central area.

Figure 9:
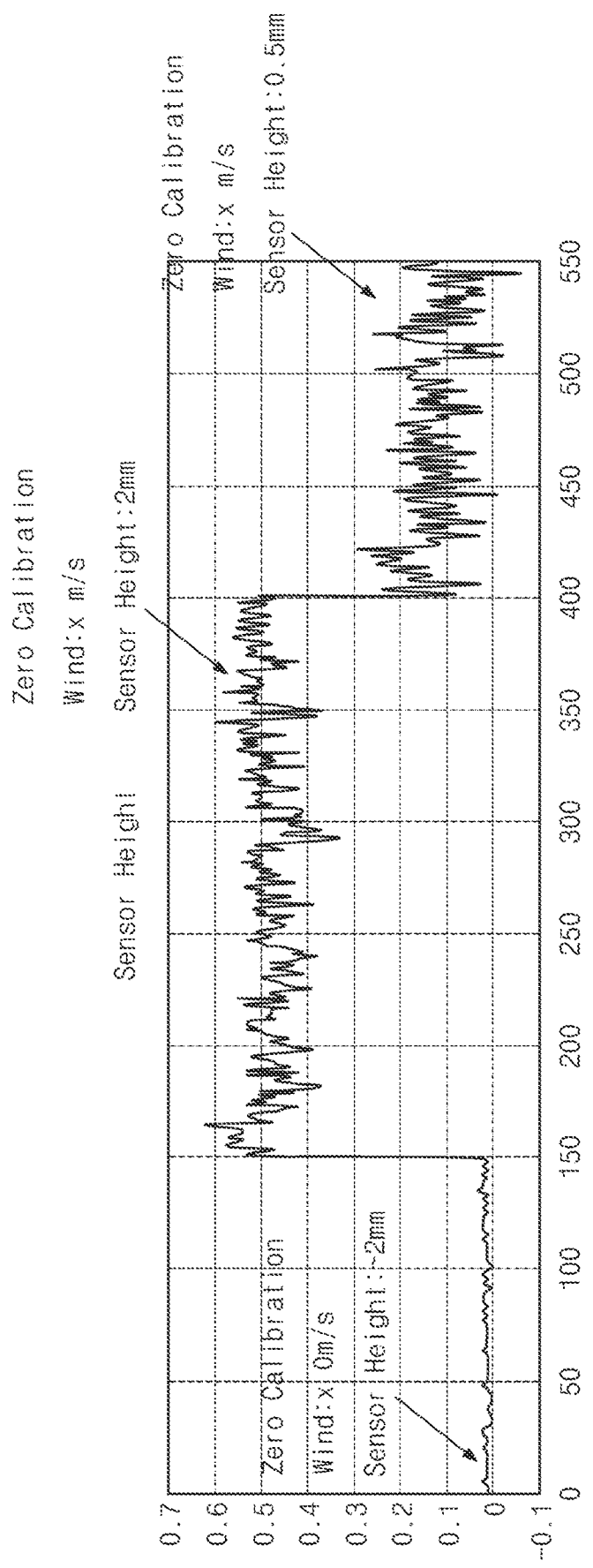

FIG. 9 shows the measurement results with changing the spaced part distance of the sensors from the upper surface of the circuit board.

Referring to FIG. 9, the wind velocity output changes according to a height of a sensor for the same wind velocity. According to FIG. 9, a wind velocity can be measured conveniently even when the hot-wired wind velocity sensor 20 is placed apart 0.5 mm from the circuit board 10. According to this, by adjusting the spaced apart distance between the hot-wired wind velocity sensor 20 and the circuit board 10, a wind velocity of a wafer type sensor unit 1 can be measured in various conditions.

The effects of the inventive concept are not limited to the above-mentioned effects, and the unmentioned effects can be clearly understood by those skilled in the art to which the inventive concept pertains from the specification and the accompanying drawings. Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A wafer type sensor unit for acquiring data on a wind direction and a wind velocity of an air flow during processing, the wafer type sensor unit supported by a supporting unit of a substrate processing apparatus, the wafer type sensor unit comprising:
    a wafer-shaped circuit board; and
    a plurality of hot-wired wind velocity sensors placed apart from each other and positioned 0.55 mm or greater from an upper surface of the circuit board.

2. The wafer type sensor unit of claim 1, wherein the plurality of hot-wired wind velocity sensors are placed apart from a center of the circuit board.

3. The wafer type sensor unit of claim 1, wherein the plurality of hot-wired wind velocity sensors are arranged in a circular shape concentric with the center of the circuit board.

4. The wafer type sensor unit of claim 1, wherein the plurality of hot-wired wind velocity sensors are placed the same distance apart from the upper surface of the circuit board.

5. The wafer type sensor unit of claim 1, further comprising a distancing member for placing apart the circuit board and the plurality of hot-wired wind velocity sensors.

6. The wafer type sensor unit of claim 5, wherein the distancing member is provided as an insulator.

7. The wafer type sensor unit of claim 5, wherein the wafer type sensor unit further comprises an electronic device installed on a bottom surface of the circuit board.

8. The wafer type sensor unit of claim 7, wherein the electronic device further comprises:
    a power unit; and
    a signal processing unit which processes signals of the circuit board.

9. A wafer type sensor unit for acquiring data on a wind direction and a wind velocity of an air flow during processing, the wafer type sensor unit supported by a supporting unit of a substrate processing apparatus, the wafer type sensor unit comprising:
    a wafer-shaped circuit board; and
    a coated electronic device installed on an upper surface of the circuit board; and
    a plurality of hot-wired wind velocity sensors placed apart from each other and positioned 0.55 mm or greater from the upper surface of the circuit board,
    wherein the height of the plurality of hot-wired wind velocity sensors is constant from the upper surface of the circuit board.

10. The wafer type sensor unit of claim 9, wherein the plurality of hot-wired wind velocity sensors are placed apart from a center of the circuit board.

11. The wafer type sensor unit of claim 9, wherein the plurality of hot-wired wind velocity sensors are arranged in a circular shape concentric with the center of the circuit board.

12. The wafer type sensor unit of claim 9, wherein the plurality of hot-wired wind velocity sensors are placed the same distance apart from the upper surface of the circuit board.

13. The wafer type sensor unit of claim 9, further comprising a distancing member for placing apart the circuit board and the plurality of hot-wired wind velocity sensors.

14. The wafer type sensor unit of claim 13, wherein the distancing member is provided as an insulator.

* * * * *